Oct. 18, 1938.   W. O. LONG   2,133,897
HARROW
Filed June 14, 1937   2 Sheets-Sheet 1

Inventor
W. O. Long,
By C. A. Snow & Co.
Attorneys.

Oct. 18, 1938.     W. O. LONG     2,133,897
HARROW
Filed June 14, 1937     2 Sheets-Sheet 2
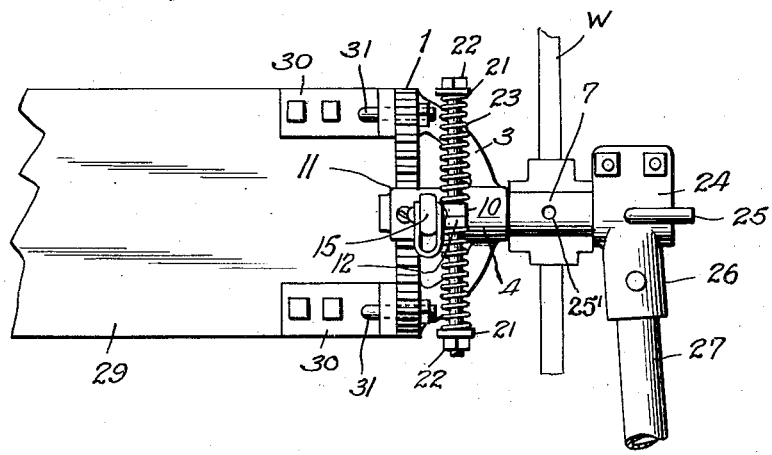
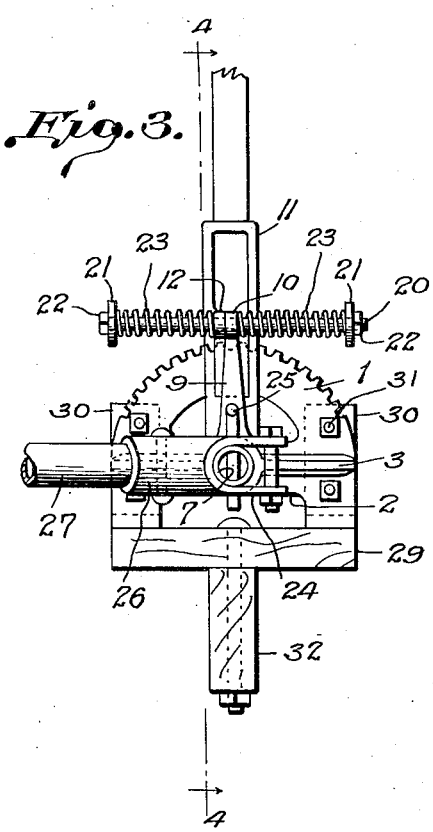
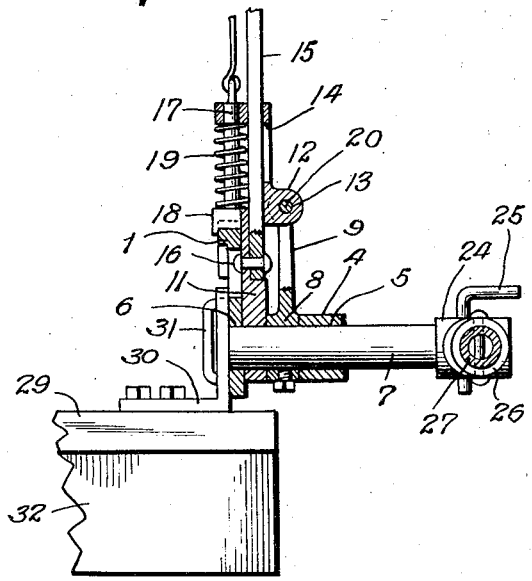
Inventor
W. O. Long,
By C. A. Snow & Co.
Attorneys.

Patented Oct. 18, 1938

2,133,897

UNITED STATES PATENT OFFICE 2,133,897

HARROW

Willard O. Long, Bloomington, Ill.

Application June 14, 1937, Serial No. 148,234

3 Claims. (Cl. 55—89)

This invention relates to harrows of that type wherein tooth carrying frames are drawn over the surface of the ground.

It is an object of the present invention to provide a harrow which can include any desired number of units, each unit being complete in itself and adapted to be placed at any suitable point upon a connecting bar or beam.

A further object is to provide harrow units the end one of which can be utilized as means for connecting to the beam the wheels used for supporting said beam.

Another object is to combine with each unit a means whereby the frame of the unit can be raised or lowered independently of the other units.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings—

Figure 2 is an enlarged plan view of the controlling portion of one of the end units, a portion of the supporting wheel associated therewith being shown.

Figure 3 is an enlarged section on line 3—3, Figure 1 showing one of the controlling portions in side elevation.

Figure 4 is a section on line 4—4, Figure 3.

Figure 1:
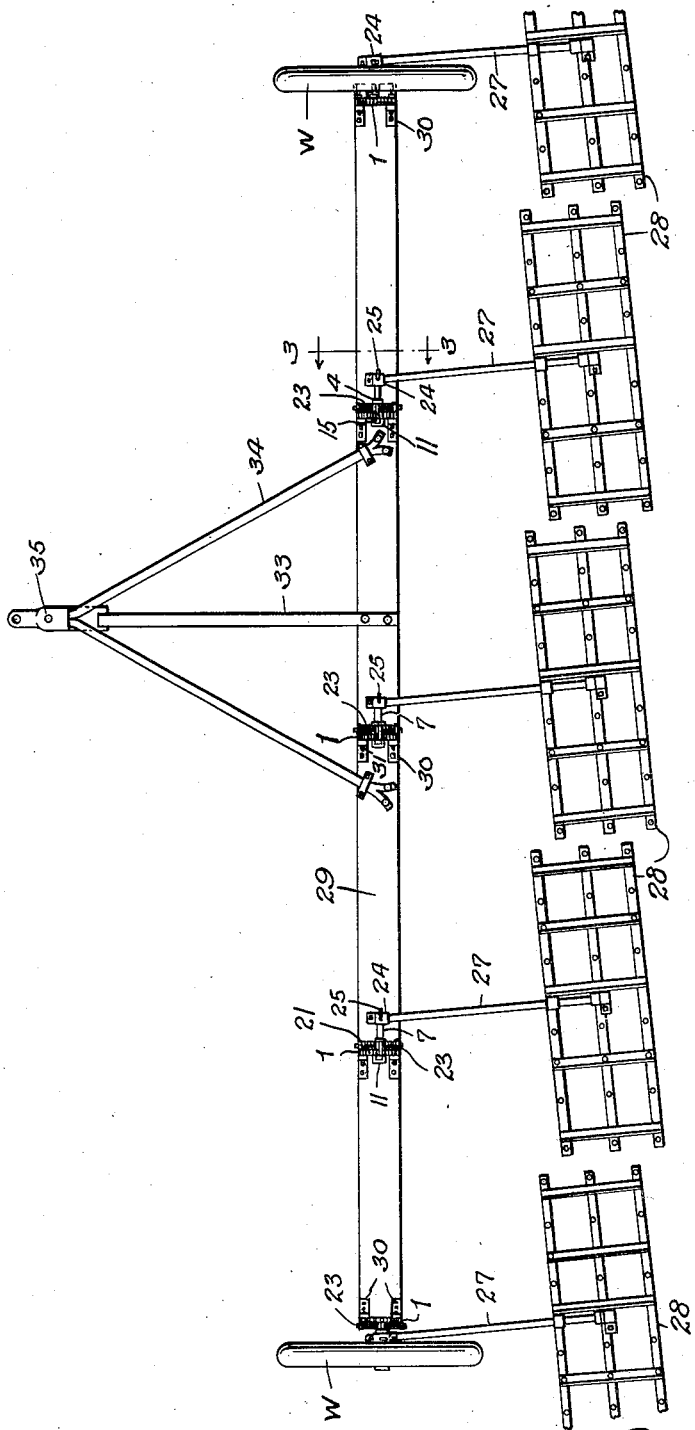
Figure 1 is a plan view of a harrow embodying the present improvements, the same including several connected units.

Referring to the figures by characters of reference I designates a toothed segment opposed portions of which are connected by a cross-bar 2 and by an integral yoke 3. A bearing sleeve 4 is formed integral with the center of the yoke and provides an opening 5 which alines with a corresponding opening 6 formed in the bar 2.

A stub axle 7 is mounted for rotation within the openings 5 and 6 and secured to this shaft between sleeve 4 and bar 2 is a collar 8 which serves to hold the axle against longitudinal displacement. This collar has an arm extending therefrom as shown at 9 and terminating in an eye 10.

Mounted on axle 7 between bar 2 and collar 8 is a bar 11 extending upwardly beyond arm 9 and formed with a laterally extending ear 12 having a transverse opening 13. In this bar is formed a socket 14 for the reception of an elongated handle 15 one end of which can be riveted or otherwise attached to bar 11 as shown at 16.

A dog 17 is slidably mounted in bar 11 and is provided with a head 18 adapted to engage segment 1. A spring 19 is interposed between head 18 and the outer end portion of bar 11 and serves to hold the head 18 in engagement with the segment as shown, for example, in Figure 4.

A rod 20 is slidably mounted in eye 10 and opening 13 and is provided at its ends with washers 21 or the like held in place by nuts 22 or other suitable retaining means so as thus to constitute abutments for coiled springs 23. One of these springs is mounted on each end portion of rod 20 and are spaced apart at their inner ends by the eye 10 and ear 12.

Axle 7 projects in one direction away from sleeve 4 and mounted on the free end thereof is a split collar 24 which can be held to the axle by a removable pin 25 extending diametrically through the sleeve and one of a pair of openings 25' in the axle. A tubular extension 26 is made integral with sleeve or collar 24 and is attached to the forward end of a draw bar 27 the other end of which is connected to the tooth carrying frame 28 constituting the harrow section of the unit.

In assembling units for the purpose of forming a harrow having a plurality of sections, there is provided a wooden beam 29 to which are secured, at regular intervals, pairs of angular brackets 30, the brackets of each pair being located one in front of the other. These brackets are then joined by U-bolts 31 or the like to opposed portions of segment 1 so that the unit heretofore described is thus attached securely to the beam. One of the units is located at one end of the beam so that its axle 7 will project beyond the beam as shown in Figure 2. The unit at the opposite end of the beam is reversed relative to the other units so that its axle 7 will also project beyond the end of the beam but oppositely to the axle at the other end of the beam. In every case, however, the bars 27 are extended backwardly from the beam. Where the axle is extended in the opposite direction, as shown for example, at the left of Figure 1, the bar 27 is mounted on the axle between the wheel and the beam, the wheel W being located at the outer end of the axle as shown. Thus there will be ample clearance for the operation of the wheel and for the movement of the bar 27.

As shown in Figures 3 and 4 the beam 29 can be reenforced by arranging thereunder a longitudinal beam 32 secured thereto.

After the units have been assembled as described, the collars 24 are removed from the axles of the end units, supporting wheels are placed on said axles, as shown at W and collars 24 are then replaced so as not only to hold the wheels on the axles but also to connect the end bars 27 to said axles.

Any desired means can be employed for connecting bar 29 to a tractor or other draft means. For example a tongue 33 having braces 34 can be extended forwardly from the beam and provided with a suitable hitch indicated generally at 35.

A harrow such as herein described enables the user to readily raise or lower any one of the frames by actuating its handle 15 and it also affords a simple and efficient means for connecting the supporting wheels to the beam. It becomes possible readily to assemble any desired number of units in one machine, it being necessary only to provide a beam of proper length.

Obviously when any handle 15 is moved in one direction it will cause a corresponding movement of bar 11 which will thrust through the spring 23 in the path thereof and against one of the abutments 21 so as to move the rod 20 longitudinally and cause the other abutment 21 to thrust through the other spring 23 against eye 10. Consequently arm 9 will be actuated to rotate axle 7 and cause the teeth on the frame 28 to press yieldingly against the surface thereunder. While handle 15 is in this new position it can be held by the dog 18 engaging segment 1. By reversing the motion of the parts the ear 12 can be brought against eye 10 to positively actuate arm 9 and lift frame 28 to a desired elevation above the ground where it can be locked by dog 18 and segment 1.

What is claimed is:

1. A harrow including a beam, a segment secured to each end thereof, spaced bearing members carried by the segment, an axle journalled in the bearing members of each segment, said axles projecting in opposite directions beyond the respective ends of the beam, draw bars, means for attaching said bars to the ends of the respective axles, supporting wheels journalled on the axles, harrow frames carried by the respective draw bars, and separate means for rotating the respective axles within their wheels for raising or lowering the bars and frames.

2. A harrow including a beam, harrow units secured to each end of the beam, each unit including an axle projecting beyond the end of the beam, means for supporting the axle for rotation, means for rotating the axle, a harrow frame, and means for attaching said frame to the end of the axle, and a supporting wheel mounted on each axle.

3. A harrow including a beam, a plurality of harrow units detachably secured to and extending across the beam, each of said units comprising a segment, a rotatable stub axle journalled therein, cushioned means for rotating the axle, a collar detachably connected to one end of the axle, and a harrow frame connected to each collar, two of said units being positioned at the ends of the beam with their axles extended in opposite directions respectively beyond the beam, and supporting wheels mounted on the axles of said end units.

WILLARD O. LONG.